No. 673,998. Patented May 14, 1901.
E. CLIFF.
SIDE BEARING FOR RAILWAY CARS.
(Application filed Jan. 4, 1901.)
(No Model.)
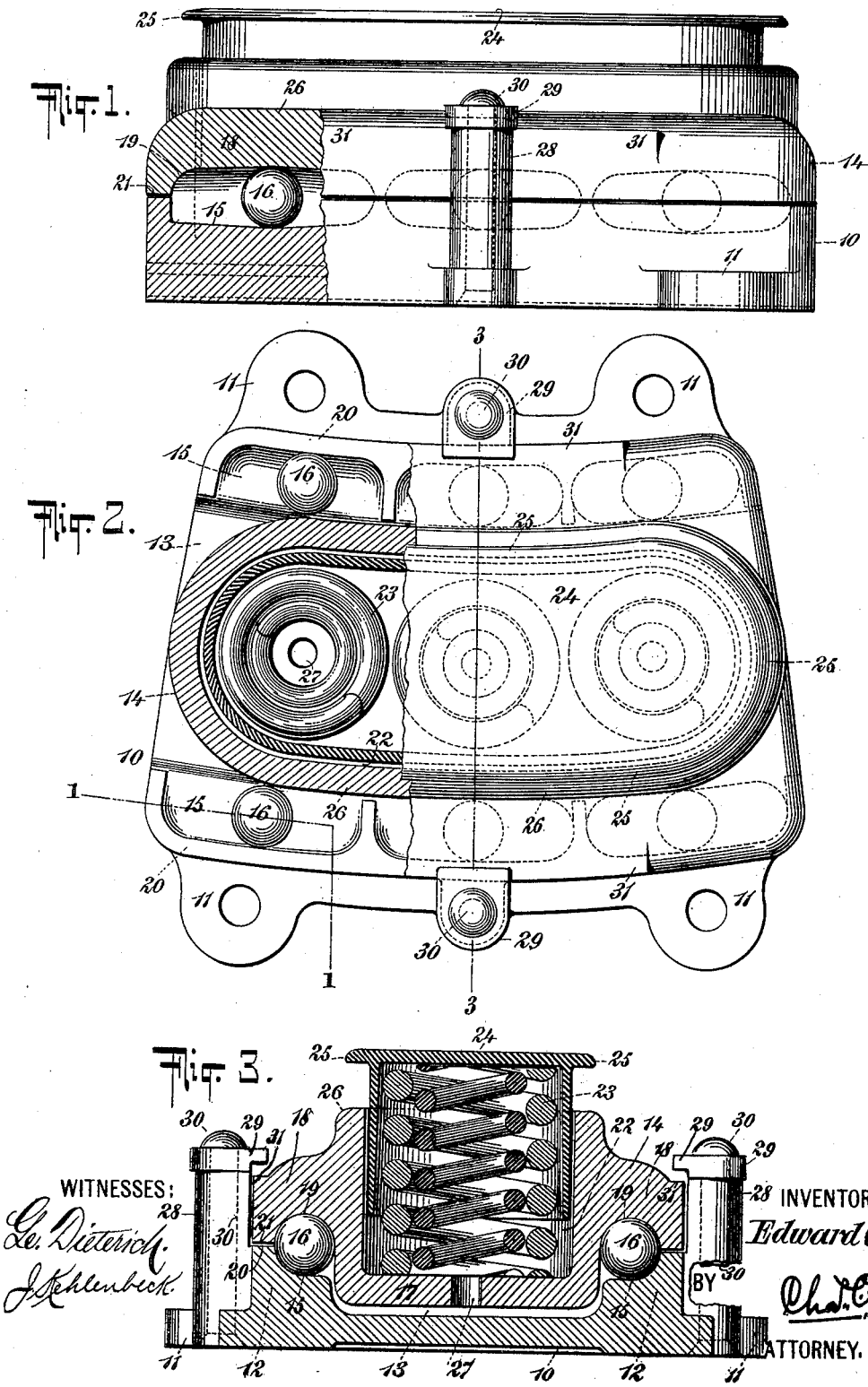

UNITED STATES PATENT OFFICE.

EDWARD CLIFF, OF NEWARK, NEW JERSEY.

SIDE BEARING FOR RAILWAY-CARS.

SPECIFICATION forming part of Letters Patent No. 673,998, dated May 14, 1901.

Application filed January 4, 1901. Serial No. 42,034. (No model.)

*To all whom it may concern:*

Be it known that I, EDWARD CLIFF, a citizen of the United States, and a resident of Newark, in the county of Essex and State of New Jersey, have invented certain new and useful Improvements in Side Bearings for Railway-Cars, of which the following is a specification.

The invention relates to improvements in side bearings for railway-cars; and it consists in the novel features, arrangement, and combinations of parts hereinafter described, and particularly pointed out in the claims.

The object of the invention is to produce a more efficient side bearing than any heretofore known to me, and one especially capable of obviating the known difficulties incident to hauling the cars around curves, especially short and tangent curves, and permitting the ready straightening out of the cars into alinement with the trucks after the cars have passed around such curves.

The side bearings made the subject hereof are particularly applicable to swiveling car-trucks and are applied in the ordinary manner intermediate the outer ends of the truck-bolster and body-bolster.

The invention will be fully understood from the detailed description hereinafter presented, reference being had to the accompanying drawings, in which—

Figure 1 is a side elevation, partly broken away and partly in section, of a side bearing constructed in accordance with and embodying the invention. Fig. 2 is a top view, partly broken away and partly in section, of same, and in Fig. 2 I indicate by the dotted line 1 1 the section on which the sectional part of Fig. 1 is taken; and Fig. 3 is a central vertical transverse section of same on the dotted line 3 3 of Fig. 2.

In the drawings, 10 designates the base-plate of the side bearing, said base-plate being formed with the ears 11 to receive the bolts by which the side bearing may be secured upon the end of the truck-bolster. (Not shown.) The base-plate 10 is in one integral casting and is formed with the vertical sides or flanges 12 12, between which a broad groove or runway 13 is formed for the reception of the central portion of the upper section 14 of the side bearing. The runway 13 is open at its ends, so as to permit the upper section 14 to have a substantially longitudinal motion upon said base 10. In the upper surfaces of the sides 12 of the base 10 are formed the series of grooves 15, which have no communication with each other and which receive the balls 16, upon which the upper section 14 has its bearing, said balls 16 being independent of one another and each confined within its own groove 15. The number of grooves 15 and balls 16 employed in the side bearing will depend somewhat upon the size of the structure and other conditions; but I recommend that three of the grooves 15 and three of the balls 16 be employed at each side of the base 10, as illustrated in the drawings.

The upper section or part 14 of the side bearing has its central longitudinal portion 17 disposed within the runway 13 of the base 10 and its side portions 18 18 disposed directly over the sides 12 of the said base 10, and in the lower face of the said side portions 18 are formed the series of grooves 19, corresponding with the grooves 15 in the base 10 and adapted when said section 14 is in position to match said grooves 15 and form elongated chambers at each side of the bearing to inclose the balls 16. At the opposite sides of the bearing the base 10 is formed at the top of the sides 12 with a horizontal shoulder 20, and at the said opposite sides of the bearing the upper section 14 is formed at the lower edges of its sides 18 with the shoulder 21, said shoulders 20 21 substantially matching one another, but being at all times separated from one another by the presence within the grooves 15 19 of the balls 16, the chambers formed by said grooves 15 and 19 being of such depth that when the balls 16 are therein the said balls will keep the upper section 14 of the bearing from contact with the lower section or base 10 of said bearing. The grooves 15 and 19 are slightly concave at their middle portions and gradually incline from their central portion toward their ends, and the normal position of the balls 16 is at the central or deeper part of said grooves, as shown in Fig. 1. The form of the grooves 15 and 19 is very important in that by reason thereof the upper part or section 14 of the side bearing is not only permitted to travel in a substantially longitudinal direction upon the balls 16, but that during such travel the said balls 16 ride against the inclined surfaces of the said grooves and into the narrower (in a vertical direction) ends of said grooves and force the upper part or section 14 to a slightly-greater elevation, and the form of said grooves 15 19 is also very important in that by reason thereof the balls 16 become restored to their normal position in the central part of said grooves when the upper section 14 returns to its normal position over the base 10, as shown in Fig. 1.

The facing sides of the grooves 15 in the base 10 open into the runway 13 of said base, thereby permitting the escape from said grooves 15 of any dust that may enter the same, said dust passing into the runway 13 and leaving the latter at its open ends. The central portion of the upper part or section 14 is hollow to form a chamber 22, within which are placed the springs 23 and vertical sides of the cap 24, which passes downward upon said springs 23 and at its upper end furnishes the surfaces against which the rub-irons on the body-bolster may contact. The cap 24 is of elongated form, extending substantially the entire length of the upper section 14 and being confined against undue lateral motion by the walls of the chamber 22. The cap 24 bears directly upon the springs 23 and normally extends above the upper section 14 of the side bearing, and the edges of the top of the cap 24 are formed with the encompassing horizontal flange 25, which projects laterally beyond the vertical sides of the cap 24 and, when the cap 24 is fully depressed, bears upon the encompassing flange 26, surrounding the upper edge of the chamber 22 and integral with the section 14, the said flange 26 forming a base to receive the flange 25 of the cap 24, and said flange 25 under such conditions not only forming an extended bearing-surface for the rub-irons of the car-body, but also serving to cover the joint between the vertical sides of the cap 24 and the vertical side walls of the chamber 22, thereby protecting the said section 14 and also excluding dust or grindings from the chamber 22. Any dust or grindings, however, which may enter the chamber 22 may find an outlet through the hole 27 in the base of the section 14, said hole 27 leading into the runway 13, which is open at its opposite ends. The cap 24 is held up by the springs 23, and in use is capable of having a vertical movement and to yield under the impact of the rub-iron on the car-body bolster.

In order that the upper section 14 of the side bearing may not under any circumstances be thrown upward from the base 10, I provide on said base the vertical tubular ears 28 28 to receive upon their upper edges the clips 29 and in their interior the bolts 30, said bolts passing downward through said tubular ears 28 and holding the clips 29 upon the upper ends of said ears. The clips 29 project over the opposite side edges of the section 14, but do not contact with said edges under normal conditions, and the opposite side edges of the section 14 are formed with horizontal shoulders 31, over which the clips 29 pass, and which are of such length that they will remain below the clips 29 during the travel in either direction of the section 14 upon the balls 16. The clips 29 perform no office except to prevent, under unusual circumstances, the section 14 from losing its place upon the base or lower section 10.

I illustrate the side bearing as being curved on the arc of a circle, this being a customary form for side bearings, the center of the circle on which the side bearing is curved being the king-bolt of the car-truck. It is obvious, however, that the side bearing may be made straight instead of curved, both forms of side bearings being well known in the art. The upper section 14 of the side bearing is shown in the accompanying drawings as resting upon the balls 16; but I do not limit my invention to the specific use of round balls 16, since in this art rollers and balls have come to be well known, and hence my invention comprises the employment of either the round balls 16 or rollers in lieu of the balls. When rollers are employed instead of balls 16, the grooves 15 and 19 will have the concave surfaces, as hereinbefore described, but will not be circular in cross-section, but will have the rectangular shape in cross-section of the rollers. In the employment of either the balls or the rollers the said devices constitute rotary traveling bearings for the upper section 14, and in respect of my present invention they are to be regarded as equivalents for one another.

In the employment of the invention the lower section or base 10 of the side bearing will be securely fastened upon the end of the truck-bolster and the upper section 14 will be applied upon the said lower section or base 10 in the manner shown in Figs. 1 and 3, and thereupon the springs 23 and cap 24 being in position the said bearing will be in condition for use. The top of the cap 24 will afford the rubbing-surfaces for the usual rub-irons on the ends of the body-bolster, and under the impact of said body-bolster the cap 24 will yield upon the springs 23, the springs 23 saving the other parts of the side bearing from material jar. During the moving of the car the rub-iron on the body-bolster will move against the top of the cap 24, and under the friction thus created the cap 24 and the upper section 14 will move in a longitudinal direction upon the base or lower section 10, said section 14 at such time not rubbing against the lower section or base 10, but riding on the series of independent rotary bearings 16, the latter not only rotating, but having a traveling movement along the inclined surfaces of the grooves 15 19 and moving, as the upper section 14 is caused to travel endwise, into the narrower parts of the said grooves. Upon the return of the cars to the straight portion of the track the upper section 14 will, under the influence of the rub-iron, move back to its normal position and return the rotary bearings 16 to their normal position centrally within the said grooves 15 19.

It is to be understood that the invention is not limited in its broader scope to the special springs 23 in the location in which they are shown in the drawings, since said springs may be otherwise located or disposed in side bearings having upper and lower members and suitable interposed rotary bearings without departing from the spirit or scope of my invention. The interposed springs 23 receive the initial thrust of the body-bolster and create a yielding resistance between the body and truck bolsters and add to the life and efficiency of roller side bearings.

What I claim as my invention, and desire to secure by Letters Patent, is—

1. In a side bearing, the lower or base section 10 having the runway 13 and sides 12, the latter containing the independent grooves 15, and the rotary bearings 16 within said grooves, combined with the upper section 14 having the projecting portion 17 to move in said runway 13 and provided in its sides 18 with the grooves 19, the latter matching the grooves 15 in the base-section and therewith forming chambers for said rotary bearings 16, said chambers being concaved at their central upper and lower surfaces and thence tapering on converging lines toward their end portions; substantially as set forth.

2. In a side bearing, the base or lower section 10 having the runway 13 open at both ends and provided with the sides 12 containing the series of independent grooves 15, and the rotary bearings 16 within said grooves 15, combined with the upper section 14 having in its opposite sides the series of grooves 19 adapted to match said grooves 15 and therewith form chambers for said rotary bearings 16, said chambers opening into said runway whereby dust may escape therefrom into said runway; substantially as set forth.

3. In a side bearing, the lower or base section 10, the upper section 14 adapted to said lower section, and rotary bearings intermediate said sections, whereby said upper section is adapted to have a traveling or endwise movement, said rotary bearings serving to keep the said sections apart and to receive the weight which may be applied upon said upper section, combined with the cap applied to said upper section, and means yieldingly supporting said cap normally above said upper section, said cap being thus adapted to receive the contact of the rub-iron on the body-bolster; substantially as set forth.

4. In a side bearing, the lower or base section 10, the upper section 14 adapted to said lower section, and rotary bearings intermediate said sections, whereby said upper section is adapted to have a traveling or endwise movement, said rotary bearings serving to keep the said sections apart and to receive the weight which may be applied upon said upper section, combined with the cap applied to said upper section, and a yielding support concealed within said upper section and sustaining said cap in a normal position above said upper section, whereby said cap is enabled to receive the contact of the rub-iron on the body-bolster; substantially as set forth.

5. In a side bearing, the lower or base section, the upper section adapted thereto, and rotary bearings intermediate said sections whereby the upper section is enabled to have an endwise or traveling motion, said upper section also having an interior chamber 22 open at its upper end, combined with the springs within said chamber, the cap mounted upon said springs and having its sides guided on the walls of said chamber, said springs normally holding the said cap above said upper section so as to enable it to receive the contact of the rub-iron on the body-bolster; substantially as set forth.

6. In a side bearing, the base or lower section, the upper section adapted thereto, and rotary bearings intermediate said sections and adapted to permit said upper section to have an endwise or traveling motion, and said upper section having a spring-chamber 22 in its upper side, combined with the cap 24 for said chamber, and a spring-support within said chamber for said cap, said cap having along its edges the flange 25 projecting laterally beyond the side walls of said chamber; substantially as set forth.

7. In a side bearing, the base-section, the upper section adapted thereto, and rotary bearings intermediate said sections and supporting the upper section over the base-section and permitting said upper section to have an endwise or traveling motion without rubbing against said base-section, combined with the vertically-yielding spring-supported surface normally projecting above and carried by said upper section for contact with the rub-iron on the body-bolster; substantially as set forth.

8. In a side bearing, the base or lower section, the upper section adapted thereto, and rotary bearings intermediate said sections and adapted to support said upper section and permit an endwise or traveling motion to be imparted thereto, said upper section having the elongated spring-chamber 22, combined with the cap 24 having its sides adapted to the walls of said chamber, and the series of springs within said chamber and cap and adapted to normally support said cap in position projecting above said upper section, whereby said cap is enabled to receive the contact of the rub-iron on the body-bolster; substantially as set forth.

9. In a side bearing, the base-section, the upper section adapted thereto, and rotary bearings confined within chambers therefor intermediate said sections and having inclined surfaces on which the said bearings may ride from their normal position, combined with the cap applied to said upper section, and means yieldingly supporting said cap normally above said upper section, said cap being thus adapted to receive the contact of the rub-iron on the body-bolster; substantially as set forth.

10. In a side bearing, the base-section, the upper section adapted thereto, and rotary bearings intermediate said sections and upon which said upper section is adapted to have an endwise or traveling movement, combined with the yielding bearing plate or surface carried by said upper section; substantially as set forth.

11. In a side bearing, the base-section, the upper section adapted thereto, the series of rotary bearings confined between said sections and free to rotate and travel longitudinally of the side bearing, said upper section being adapted to have an endwise motion on said rotary bearings, combined with the yielding bearing plate or surface carried by said upper section; substantially as set forth.

12. In a side bearing, the base-section, an upper section adapted thereto, and rotary bearings intermediate said sections and upon which said upper section is adapted to have an endwise or traveling movement, combined with an interposed spring adapted to receive the initial force of the body-bolster; substantially as set forth.

13. In a side bearing, the two members forming longitudinal chambers between them, and the rotary bearings within said chambers and on which the upper of said members is adapted to travel in an endwise direction, combined with an interposed spring to take the initial force of the body-bolster; substantially as set forth.

Signed at New York, in the county of New York and State of New York, this 3d day of January, A. D. 1901.

EDWARD CLIFF.

Witnesses:
CHAS. C. GILL,
GUNDER GUNDERSON.